US008536978B2

(12) United States Patent
Coggill

(10) Patent No.: US 8,536,978 B2
(45) Date of Patent: Sep. 17, 2013

(54) DETECTION OF DURESS CONDITION AT A COMMUNICATION DEVICE

(75) Inventor: Henry Dunstan Coggill, Slough (GB)

(73) Assignee: BlackBerry Limited, Waterloo (CA)

( * ) Notice: Subject to any disclaimer, the term of this patent is extended or adjusted under 35 U.S.C. 154(b) by 378 days.

(21) Appl. No.: 12/949,940

(22) Filed: Nov. 19, 2010

(65) Prior Publication Data

US 2012/0126940 A1   May 24, 2012

(51) Int. Cl.
*G05B 23/00* (2006.01)
(52) U.S. Cl.
USPC ......... 340/5.54; 340/5.85; 345/156; 345/169; 345/173; 455/410; 455/411
(58) Field of Classification Search
None
See application file for complete search history.

(56) References Cited

U.S. PATENT DOCUMENTS

| | | | |
|---|---|---|---|
| 6,509,847 B1 | 1/2003 | Anderson | |
| 6,720,860 B1 | 4/2004 | Narayanaswami | |
| 7,301,529 B2 | 11/2007 | Marvit et al. | |
| 7,308,652 B2 | 12/2007 | Comfort et al. | |
| 7,574,200 B2 | 8/2009 | Hassan et al. | |
| 7,593,000 B1 * | 9/2009 | Chin | 345/156 |
| 7,603,143 B2 | 10/2009 | Kang et al. | |
| 2004/0111646 A1 | 6/2004 | Little | |
| 2004/0155991 A1 | 8/2004 | Lowles et al. | |
| 2007/0015490 A1 * | 1/2007 | Munje et al. | 455/410 |
| 2007/0259685 A1 | 11/2007 | Engblom et al. | |
| 2008/0022226 A1 | 1/2008 | Brown et al. | |
| 2008/0082930 A1 | 4/2008 | Omernick et al. | |
| 2008/0184360 A1 | 7/2008 | Kornilovsky et al. | |
| 2009/0193361 A1 | 7/2009 | Lee et al. | |
| 2009/0235197 A1 | 9/2009 | Chen et al. | |
| 2009/0244013 A1 | 10/2009 | Eldershaw | |
| 2009/0256807 A1 | 10/2009 | Nurmi | |
| 2009/0259968 A1 | 10/2009 | Hsieh et al. | |
| 2010/0017872 A1 | 1/2010 | Goertz et al. | |

(Continued)

FOREIGN PATENT DOCUMENTS

| | | |
|---|---|---|
| CN | 101667100 A | 3/2010 |
| EP | 1881436 A1 | 1/2008 |
| WO | 2007019767 A1 | 2/2007 |
| WO | 2010043277 A1 | 4/2010 |

OTHER PUBLICATIONS

Extended European Search Report dated Apr. 6, 2011 from EP10191822.

(Continued)

*Primary Examiner* — Tai T Nguyen
*Assistant Examiner* — Ojiako Nwugo
(74) *Attorney, Agent, or Firm* — Novak Druce Connolly Bove + Quigg LLP

(57) ABSTRACT

A communication or computing device having a touchscreen interface is adapted to detect a duress condition upon user access through input of a gesture-based password or authentication code. One or more force sensors are provided for detection of force applied at the touchscreen surface, and interoperate with processing elements to detect input of a gesture-based password through contact at the touchscreen interface; determine that force detected by at least one of the force sensors during input of the password exceeds a predefined threshold; and compares the input password with previously stored information to determine that the input password substantially corresponds to the previously stored information. If the input password substantially corresponds to the previously stored information and the detected pressure exceeds the threshold, a duress condition is determined for the device.

18 Claims, 7 Drawing Sheets

(56) References Cited

U.S. PATENT DOCUMENTS

2010/0033439 A1 2/2010 Kodimer et al.
2010/0099394 A1 4/2010 Hainzl
2010/0128002 A1 5/2010 William et al.
2010/0156843 A1 6/2010 Paleczny et al.
2011/0050619 A1* 3/2011 Griffin .......................... 345/174

OTHER PUBLICATIONS

Karlson, A. K., "Interface and Interaction Design for One-Handed Mobile Computing", Dissertation submitted to the Faculty of the Graduate School of the University of Maryland, College Park, 2007, pp. 1-264.

De Luca et al., "PassShape—Stroke based Shape Passwords", OzCHI 2007, Nov. 28-30, 2007, Adelaide, Australia, retrieved from http://www.medien.ifi.lmu.de/pubdb/publications/pub/deluca2007ozchi2/deluca2007ozchi2.pdf.

Jansen, Wayne A., "Authenticating Users on Handheld Devices", NIST, retrieved from http://csrc.ncsl.nist.gov/groups/SNS/mobile_security/documents/mobile_devices/PP-AuthenticatingUsersOnPDAs.pdf.

Bianchi et al., "The Secure Haptic Keypad: A Tactile Password System", CHI 2010, Apr. 10-15, 2010, Atlanta, Georgia, USA, retrieved from http://www.whereveriam.org/work/UMa/note0689-Bianchi.pdf.

Sasamoto et al., "Undercover: Authentication Usable in Front of Prying Eyes", CHI 2008, Apr. 5-10, 2008, Florence, Italy.

Hasegawa et al., "New Directions in Multisensory Authentication", 2009, retrieved from http://www.andrew.cmu.edu/user/nicolasc/publications/Hasegawa-Pervasive09.pdf.

Wobbrock, Jacob O., "TapSongs: Tapping Rhythm-Based Passwords on a Single Binary Sensor", UIST '09, Oct. 4-7, 2009, Victoria, BC, Canada.

Brewster et al., "Pressure-Based Text Entry for Mobile Devices", MobileHCI '09, Sep. 15-18, 2009, Bonn, Germany.

Kim et al., "Multi-Touch Authentication on Tabletops", Copyright © 2006, http://homepages.cs.ncl.ac.uk/david.kim/multi-touch_authentication/, accessed Feb. 8, 2011.

Brewster, et al., "Pressure-based text entry for mobile devices", Abstract, MobileHCI '09, Sep. 15-18, 2009, Proceedings of the 11th International Conference on Human-Computer Interaction with Mobile Devices and Services ACM New York, NY, USA ©2009, http://portal.acm.org/citation.cfm?id=1613870&dl=GUIDE&coll=GUIDE&CFID=95980774&CFTOKEN=89040109, accessed Feb. 8, 2011.

Cechanowicz et al., "Augmenting the mouse with pressure sensitive input", Abstract, CHI '07 Proceedings of the SIGCHI conference on Human factors in computing systems, ACM New York, NY, USA ©2007, http://portal.acm.org/citation.cfm?id=1240835&dl=GUIDE&coll=GUIDE&CFID=95980774&CFTOKEN=89040109, accessed Feb. 8, 2011.

* cited by examiner

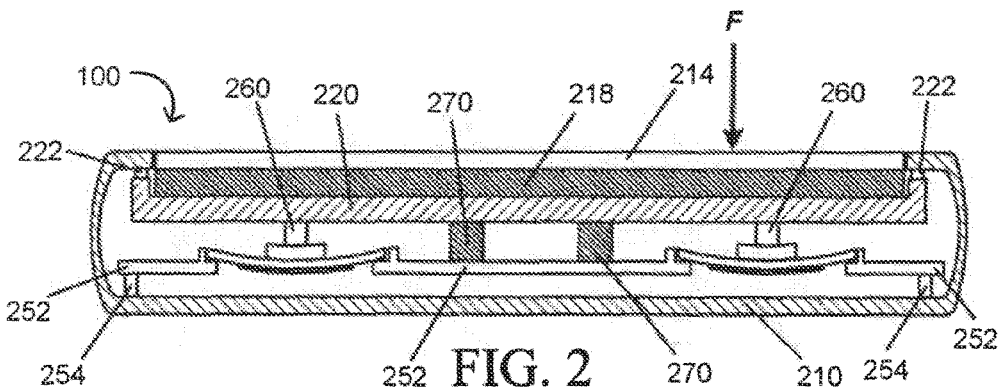
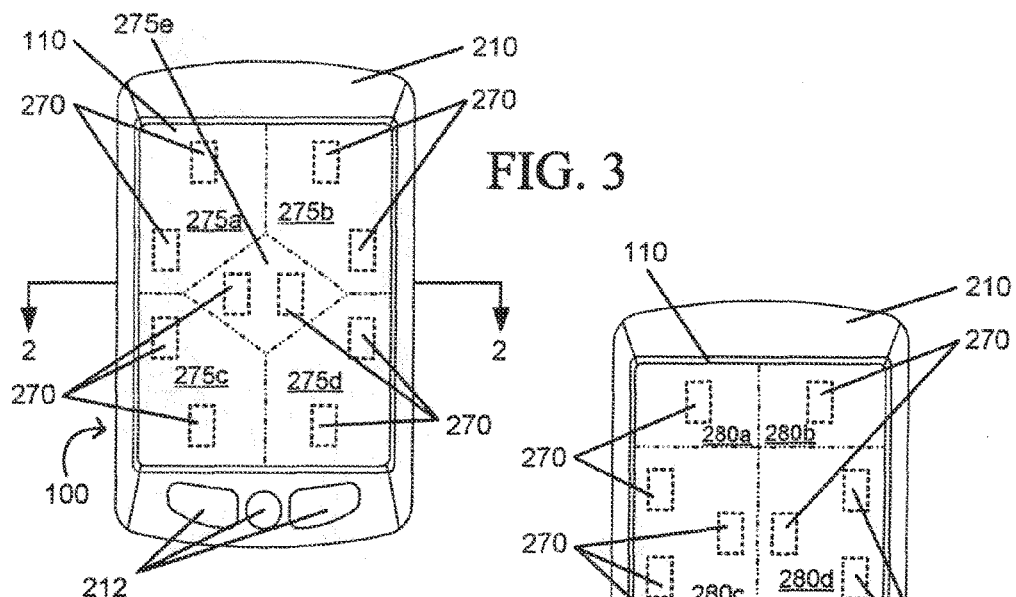
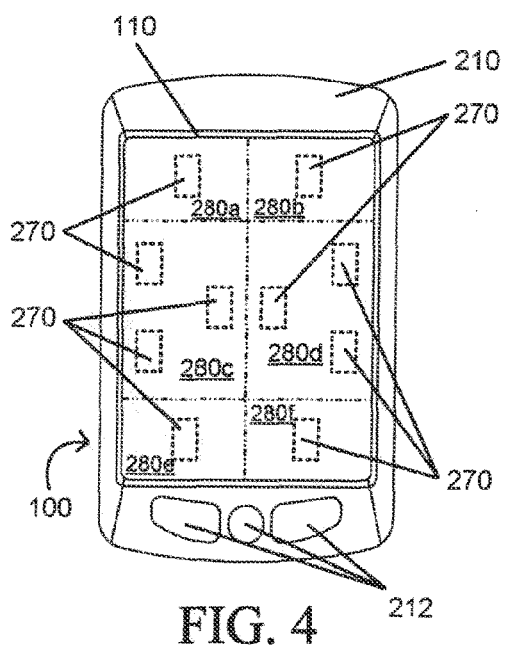
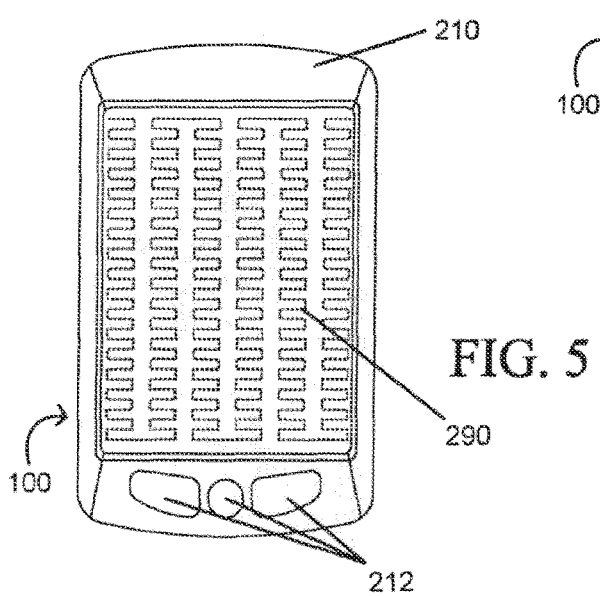

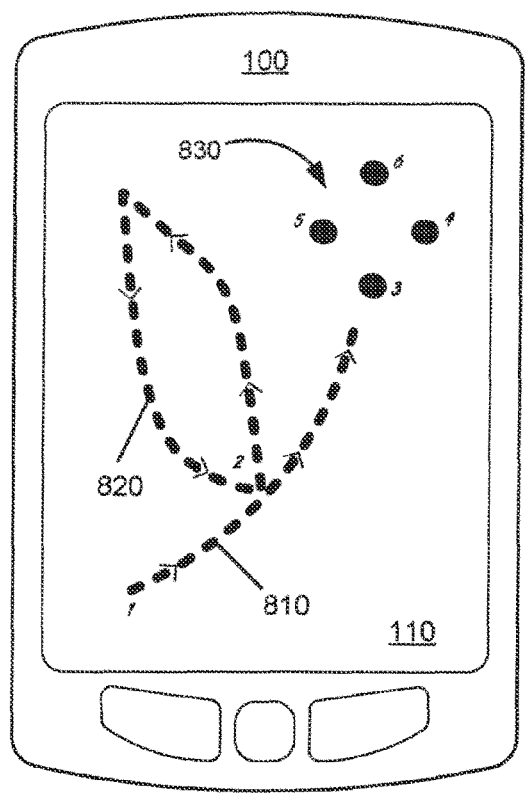
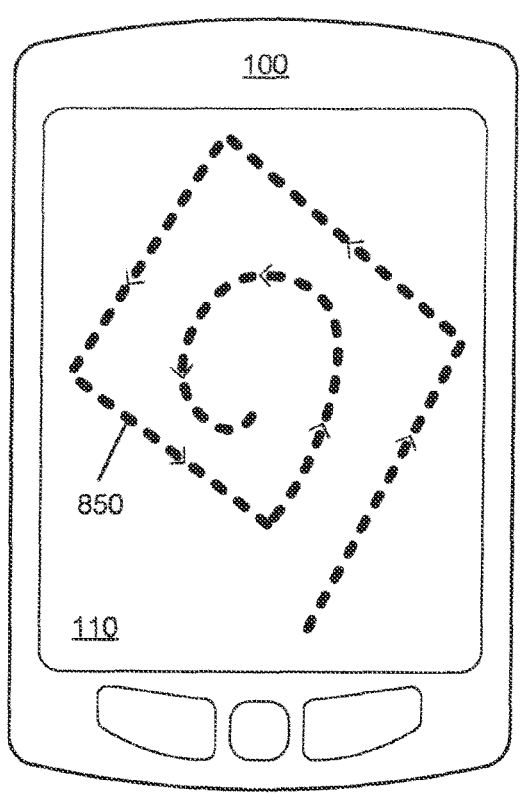
FIG. 8A  FIG. 8B
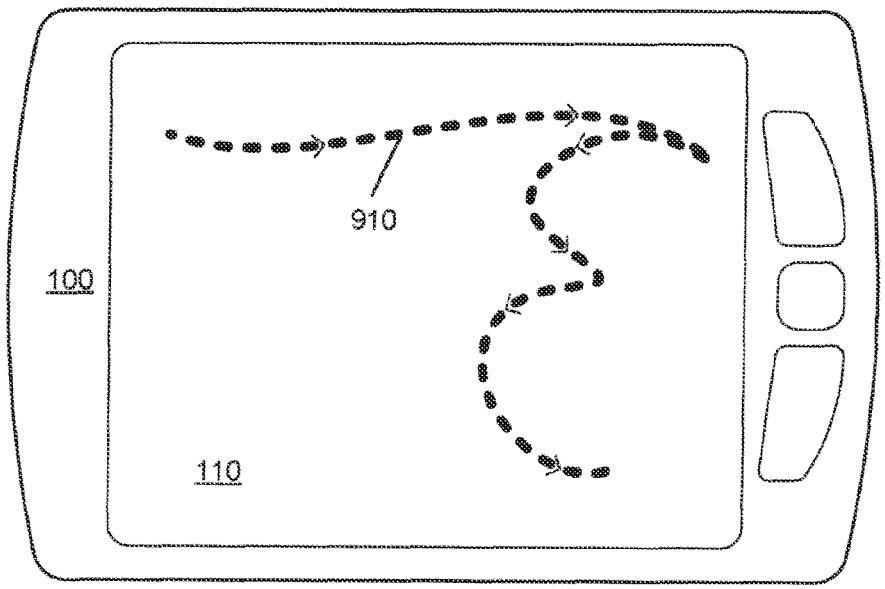
FIG. 9

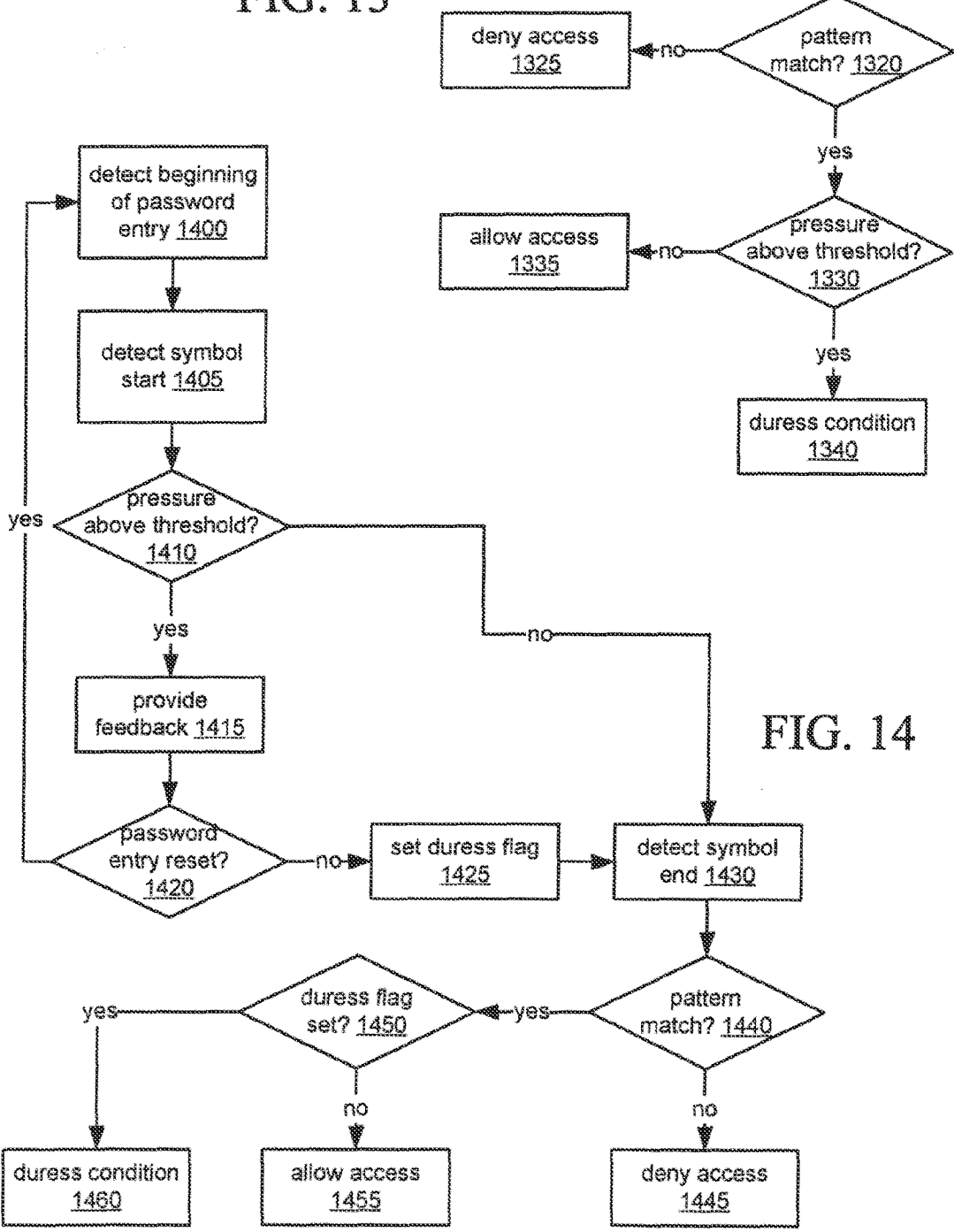

DETECTION OF DURESS CONDITION AT A COMMUNICATION DEVICE

BACKGROUND

1. Technical Field

The present application relates generally to detection of a duress situation at a communication or data processing device.

2. Description of the Related Art

Computing and communication devices, such as smartphones, tablets, and the like, often store sensitive or confidential information. To protect such information, as well as to prevent unauthorized access to functions on the device, the device may be protected with a password, PIN, or other security code or value. To access the device's functions and/or information, the user must provide the security code or value, for example via an input interface provided at the device, and may optionally be required to provide other credentials, such as a digital certificate which may be accessed from a separate smart card or other source. Typically the security code or value is only known to the authorized user; if another party, lacking this information, obtains the device, he or she will not be able to access the functions or information. An attacker seeking to gain access to the communication device may attempt to gain possession of the password by engaging in different methods of password cracking, such as dictionary attacks, or may resort to subterfuge to trick the user into revealing the password. In some circumstances, however, an attacker may use physical force or other coercion to force the authorized user to enter the security code or value on his or her own device within the attacker's presence so that the attacker can gain access to the functions or information.

BRIEF DESCRIPTION OF THE DRAWINGS

In drawings which illustrate by way of example only embodiments of the present application.

FIG. 2 is a cross-sectional view of the communication device of FIG. 1.

FIG. 3 is a top view of the communication device of FIG. 2 having a display surface defined with logical sensing regions.

FIG. 4 is a further top view of the communication device of FIG. 2 having a display surface defined with further logical sensing regions.

FIG. 5 is a further top view of the communication device of FIG. 2.

FIGS. 8A and 8B are top views of the device of FIGS. 2 to 4 in a first orientation illustrating exemplary symbol patterns for use as a password.

FIG. 9 is a top view of the device of FIGS. 2 to 4 in a second orientation illustrating exemplary symbol patterns for use as a password.

FIGS. 13 and 14 are flowcharts of exemplary methods for detecting a duress condition.

DETAILED DESCRIPTION

Figure 1:
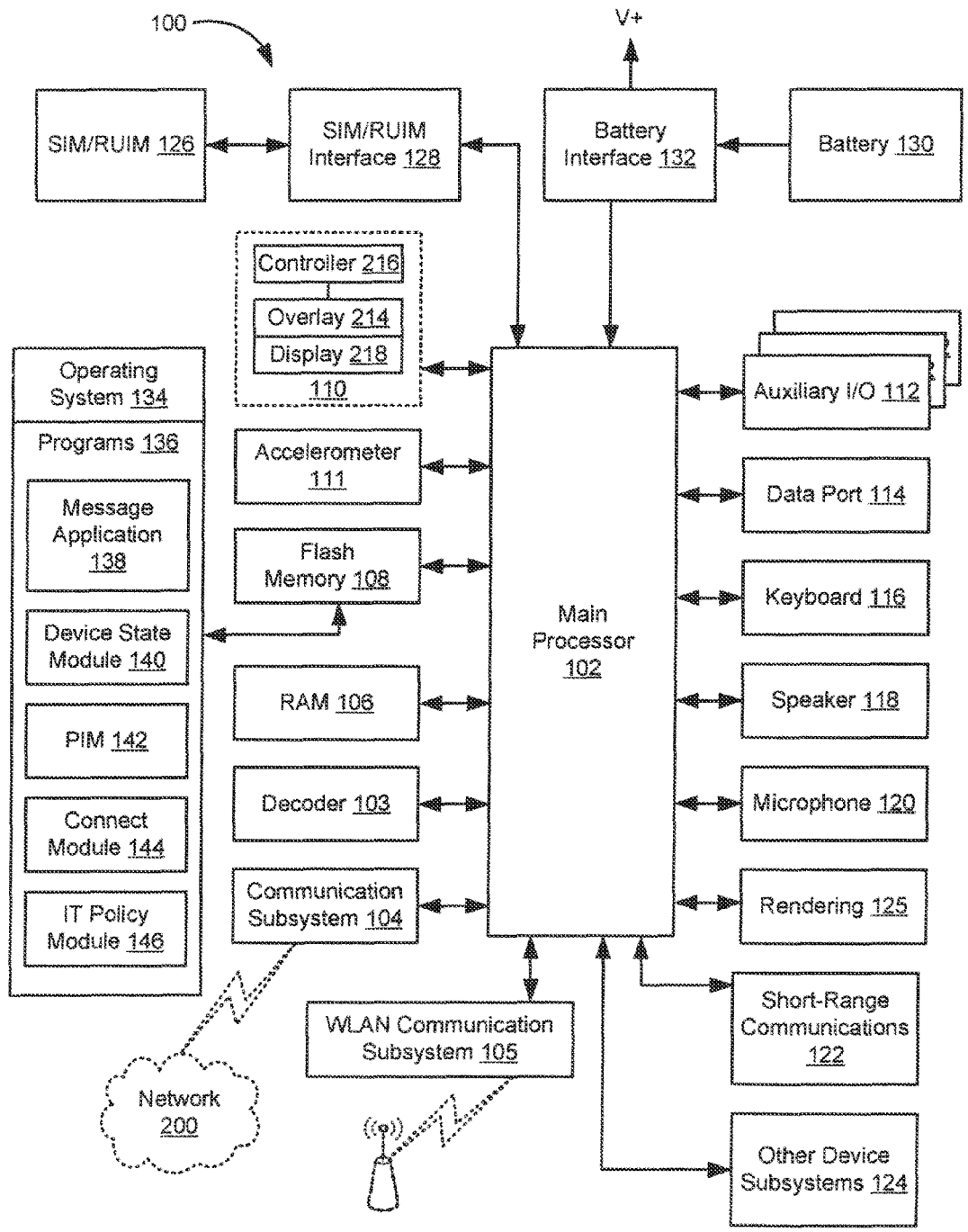
FIG. 1 is a block diagram of an embodiment of an exemplary communication device.

The methods and systems described herein provide for the detection of a duress condition at a communication or computing device, based on the user's input of a security value or code, generally referred to herein as a "password". The security value or code may take the form of a series of characters, a passphrase, access code, secret word, personal identification number (PIN), key value, and the like, and may further be represented by user actions and gestures, for example through the input of a gesture or symbol at a touchscreen interface of a device. The term "password" as used herein generally refers to all such security values or codes, as well as other types of gesture-based or other input as explained herein, such as a symbol or gesture traced or drawn on the surface of the touchscreen of a touchscreen device 100.

In accordance with the embodiments disclosed herein, there is provided a communication device, comprising a touchscreen interface configured to detect contact applied at a touchscreen surface; one or more force sensors configured to detect force applied at the touchscreen surface; at least one processor in communication with the touchscreen interface and the one or more force sensors, the at least one processor being configured to: detect contact indicative of input of a password at the touchscreen interface; detect, by the one or more force sensors, a force of said contact above a predetermined threshold; and identify a duress condition at the communication device upon determining that the input password corresponds to a previously stored password.

In an aspect of the above communication device, the password comprises a symbol password. In a further aspect, the symbol password comprises at least one of: multitouch gestures; a plurality of segments; and at least one disconnected touch.

In a further aspect of the communication device, the at least one processor is further configured to initiate a duress handling procedure upon identifying the duress condition. In yet a further aspect, the at least one processor is further configured to set a duress flag upon detection that the force of said contact is above the predetermined threshold, and to identify said duress condition upon determining that the input password corresponds to the previously stored password when said duress flag is set. In still a further aspect, the at least one processor is further configured to set said duress flag when said force above the predetermined threshold is detected during a portion of the duration of the contact indicative of said input of the password. In yet another aspect, the at least one processor is configured to determine that the input password corresponds to the previously stored password when the input password matches the previously stored password within a predefined tolerance.

The embodiments described herein further provide that in the above communication device, said force of said contact is above the predetermined threshold when an average applied force during said contact is above the predetermined threshold.

In another aspect, the one or more force sensors comprises one or more piezoelectric sensors. In still a further aspect, the communication device comprises a mobile communication device.

The embodiments herein also provide a communication device comprising: an input interface configured to detect contact; one or more force sensors configured to detect force applied at the input interface; at least one processor in communication with the input interface and the one or more force sensors, the at least one processor being configured to: detect contact indicative of input of a password at the input interface; detect by the one or more force sensors, a force of said contact above a predetermined threshold during said contact; and identify a duress condition at the communication device upon determining that the input password corresponds to a previously stored password.

In one aspect of the communication device, the input interface comprises a touchscreen interface. In another aspect, the password comprises a symbol password. In a further aspect, the input interface comprises a physical keyboard.

In still another aspect, the at least one processor is further configured to initiate a duress handling procedure upon identifying the duress condition. In yet another aspect, the at least one processor is further configured to set a duress flag upon determining that the force detected by the one or more force sensors during said contact exceeds the predetermined threshold, and to identify said duress condition upon determining that the input password corresponds to the previously stored password when said duress flag is set. Further, another aspect provides that the at least one processor is configured to determine that the input password corresponds to the previously stored password when the input password matches the previously stored password within a predefined tolerance. In addition, the communication device may comprise a mobile communication device.

There is also provided a method of detecting a duress condition at a communication device comprising a touchscreen interface, the method comprising: detecting contact indicative of input of a password at the touchscreen interface; detecting a force of said contact above a predetermined threshold; and identifying a duress condition at the communication device upon determining that the input password corresponds to a previously stored password.

In another aspect of the above method, the password comprises a symbol password. Further, the symbol password may comprise at least one of: multitouch gestures; a plurality of segments; and at least one disconnected touch.

In yet another aspect, the method further comprises initiating a duress handling procedure upon identifying the duress condition. In a further aspect, the method further comprises setting a duress flag upon detecting said force of said contact, and identifying the duress condition comprises identifying said duress condition upon determining that the input password corresponds to a previously stored password when said duress flag is set. In still a further aspect, the duress flag is set upon detection of said force during a portion of a duration of said contact, or the duress flag is set upon detection of said force during an entirety of a duration of said contact.

In another aspect of the above method, detecting said force comprises detecting an average applied force during said contact above the predetermined threshold.

In still another aspect, the one or more force sensors comprises one or more piezoelectric sensors. Further, another aspect of the method provides that said determining that the input password corresponds to the previously stored password comprises determining that the input password matches the previously stored password within a predefined tolerance.

The embodiments herein also provide a method of detecting a duress condition at a communication device comprising an input interface, the method comprising: detecting contact indicative of input of a password at the input interface; detecting a force of said contact above a predetermined threshold; and identifying a duress condition at the communication device upon determining that the input password corresponds to a previously stored password.

In an aspect of this method, the input interface comprises a touchscreen interface. In a further aspect, the password comprises a symbol password.

In a further aspect, the method further comprises initiating a duress handling procedure upon identifying the duress condition. In yet a further aspect, the method further comprises setting a duress flag upon detecting said force of said contact, and wherein identifying the duress condition comprises identifying said duress condition upon determining that the input password corresponds to a previously stored password when said duress flag is set. In yet another aspect, the duress flag is set upon detection of said force during either a portion of a duration of said contact, or an entirety of a duration of said contact.

In yet another aspect of this method, said determining that the input password corresponds to the previously stored password comprises determining that the input password matches the previously stored password within a predefined tolerance.

The embodiments herein also provide a computer program product comprising a computer-readable medium, which may be non-transitory or physical, storing program code which, when executed at a communication device comprising a touchscreen configured to detect contact at the touchscreen and one or more force sensors configured to detect an applied force at the touchscreen, causes the communication device to carry out the methods described herein.

The embodiments described herein may be implemented on a communication device such as that illustrated in FIG. 1. Throughout the specification, terms such as "may" and "can" are used interchangeably and use of any particular term should not be construed as limiting the scope or requiring experimentation to implement the claimed subject matter or embodiments described herein. The communication device 100 may be a mobile device with two-way communication and advanced data communication capabilities including the capability to communicate with other mobile devices or computer systems through a network of transceiver stations. The communication device 100 can also have voice communication capabilities. Although the embodiments herein specifically refer to a "communication device", the teachings herein may be applied to any appropriate communication or data processing device, whether portable or wirelessly enabled or not, including without limitation cellular phones, smartphones, wireless organizers, personal digital assistants, desktop computers, terminals, laptops, tablets, handheld wireless communication devices, notebook computers and the like. Thus, the communication and computing devices contemplated herein may have different principal functions and form factors.

FIG. 1 is a block diagram of an exemplary embodiment of a communication device 100 adapted to communicate over wireless networks. The communication device 100 includes a number of components such as a main processor 102 that controls the overall operation of the communication device 100. Communication functions, including data and voice communications, are performed through a communication subsystem 104. Data received by the communication device 100 can be decompressed and decrypted by decoder 103, operating according to any suitable decompression techniques, and encryption/decryption techniques according to various standards, such as Data Encryption Standard (DES), Triple DES, or Advanced Encryption Standard (AES)). Image data is typically compressed and decompressed in accordance with appropriate standards, such as JPEG, while video data is typically compressed and decompressed in accordance with appropriate standards, such as H.26x and MPEG-x series standards.

The communication subsystem 104 receives messages from and sends messages to a wireless network 200. In this exemplary embodiment of the communication device 100, the communication subsystem 104 is configured in accordance with one or more of Global System for Mobile Communication (GSM), General Packet Radio Services (GPRS) standards, Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the embodiments described herein are intended to use any other suitable standards that are developed in the future. The wireless link connecting the communication subsystem 104 with the wireless network 200 represents one or more different Radio Frequency (RF) channels, operating according to defined protocols specified for GSM, GPRS, EDGE, or UMTS, and optionally other network communications. With newer network protocols, these channels are capable of supporting both circuit switched voice communications and packet switched data communications.

Other wireless networks can also be associated with the communication device 100 in variant implementations. The different types of wireless networks that can be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks, third-generation (3G) networks like EDGE, HSPA, HSPA+, EVDO and UMTS, or fourth-generation (4G) networks such as LTE and LTE Advanced. Some other examples of data-centric networks include WiFi 802.11™, Mobitex™ and DataTAC™ network communication systems. Examples of other voice-centric data networks include Personal Communication Systems (PCS) networks like GSM and Time Division Multiple Access (TDMA) systems. The mobile device 100 may be provided with additional communication subsystems, such as the wireless LAN (WLAN) communication subsystem 105 also shown in FIG. 1. The WLAN communication subsystem may operate in accordance with a known network protocol such as one or more of the 802.11™ family of standards developed by IEEE. The communication subsystem 105 may be separate from, or integrated with, the communication subsystem 104 or with the short-range communications module 122. The main processor 102 also interacts with additional subsystems such as a Random Access Memory (RAM) 106, a flash memory 108, a display interface 110, an auxiliary input/output (I/O) subsystem 112, a data port 114, a keyboard 116, a speaker 118, a microphone 120, the short-range communications 122 and other device subsystems 124. The communication device may also be provided with an accelerometer 111, which may be used to detect gravity- or motion-induced forces and their direction. Detection of such forces applied to the device 100 may be processed to determine a response of the device 100, such as an orientation of a graphical user interface displayed on the display interface 110 in response to a determination of the current orientation of which the device 100.

Some of the subsystems of the communication device 100 perform communication-related functions, whereas other subsystems can provide "resident" or on-device functions. By way of example, the display interface 110 and the keyboard 116 can be used for both communication-related functions, such as entering a text message for transmission over the network 200, and device-resident functions such as a calculator or task list.

A rendering circuit 125 is included in the device 100. When a user specifies that a data file is to be viewed on the display interface 110, the rendering circuit 125 analyzes and processes the data file for visualization on the display interface 110. Rendering data files originally optimized or prepared for visualization on large-screen displays on a portable electronic device display often requires additional processing prior to visualization on the small-screen portable electronic device displays. This additional processing may be accomplished by the rendering engine 125. As will be appreciated by those of skill in the art, the rendering engine can be implemented in hardware, software, or a combination thereof, and can comprise a dedicated image processor and associated circuitry, or can be implemented within main processor 102.

The communication device 100 can send and receive communication signals over the wireless network 200 after required network registration or activation procedures have been completed. Network access is associated with a subscriber or user of the communication device 100. To identify a subscriber, the communication device 100 requires a SIM/RUIM card 126 (i.e. Subscriber Identity Module or a Removable User Identity Module) to be inserted into a SIM/RUIM interface 128 in order to communicate with a network. The SIM/RUIM card 126 is one type of a conventional "smart card" that can be used to identify a subscriber of the communication device 100 and to personalize the communication device 100, among other things. Without the SIM/RUIM card 126, the communication device 100 is not fully operational for communication with the wireless network 200. By inserting the SIM/RUIM card 126 into the SIM/RUIM interface 128, a subscriber can access all subscribed services. Services can include: web browsing and messaging such as e-mail, voice mail, Short Message Service (SMS), and Multimedia Messaging Services (MMS). More advanced services can include: point of sale, field service and sales force automation. The SIM/RUIM card 126 includes a processor and memory for storing information. Once the SIM/RUIM card 126 is inserted into the SIM/RUIM interface 128, it is coupled to the main processor 102. In order to identify the subscriber, the SIM/RUIM card 126 can include some user parameters such as an International Mobile Subscriber Identity (IMSI). An advantage of using the SIM/RUIM card 126 is that a subscriber is not necessarily bound by any single physical mobile device. The SIM/RUIM card 126 can store additional subscriber information for a mobile device as well, including datebook (or calendar) information and recent call information. Alternatively, user identification information can also be programmed into the flash memory 108.

The communication device 100 may be a battery-powered device including a battery interface 132 for receiving one or more rechargeable batteries 130. In at least some embodiments, the battery 130 can be a smart battery with an embedded microprocessor. The battery interface 132 is coupled to a regulator (not shown), which assists the battery 130 in providing power V+ to the communication device 100. Although current technology makes use of a battery, future technologies such as micro fuel cells can provide the power to the communication device 100.

The communication device 100 also includes an operating system 134 and software components 136 to 146 which are described in more detail below. The operating system 134 and the software components 136 to 146 that are executed by the main processor 102 are typically stored in a persistent store such as the flash memory 108, which can alternatively be a read-only memory (ROM) or similar storage element (not shown). Those skilled in the art will appreciate that portions of the operating system 134 and the software components 136 to 146, such as specific device applications, or parts thereof, can be temporarily loaded into a volatile store such as the RAM 106. Other software components can also be included, as is well known to those skilled in the art.

The subset of software applications 136 that control basic device operations, including data and voice communication applications, will normally be installed on the communication device 100 during its manufacture. Other software applications include a message application 138 that can be any suitable software program that allows a user of the communication device 100 to send and receive electronic messages. Various alternatives exist for the message application 138 as is well known to those skilled in the art. Messages that have been sent or received by the user are typically stored in the flash memory 108 of the communication device 100 or some other suitable storage element in the communication device 100. In at least some embodiments, some of the sent and received messages can be stored remotely from the device 100 such as in a data store of an associated host system that the communication device 100 communicates with.

The software applications can further include a device state module 140, a Personal Information Manager (PIM) 142, and other suitable modules (not shown). The device state module 140 provides persistence, i.e. the device state module 140 ensures that important device data is stored in persistent memory, such as the flash memory 108, so that the data is not lost when the communication device 100 is turned off or loses power.

The PIM 142 includes functionality for organizing and managing data items of interest to the user, such as, but not limited to, e-mail, contacts, calendar events, voice mails, appointments, and task items. A PIM application has the ability to send and receive data items via the wireless network 200. PIM data items can be seamlessly integrated, synchronized, and updated via the wireless network 200 with the mobile device subscriber's corresponding data items stored and/or associated with a host computer system. This functionality creates a mirrored host computer on the communication device 100 with respect to such items. This can be particularly advantageous when the host computer system is the mobile device subscriber's office computer system.

The communication device 100 also includes a connect module 144, and an information technology (IT) policy module 146. The connect module 144 implements the communication protocols that are required for the communication device 100 to communicate with the wireless infrastructure and any host system, such as an enterprise system, that the communication device 100 is authorized to interface with. Examples of a wireless infrastructure and an enterprise system are given in FIGS. 3 and 4, which are described in more detail below.

The connect module 144 includes a set of Application Programming Interfaces (APIs) that can be integrated with the communication device 100 to allow the communication device 100 to use any number of services associated with the enterprise system. The connect module 144 allows the communication device 100 to establish an end-to-end secure, authenticated communication pipe with the host system. A subset of applications for which access is provided by the connect module 144 can be used to pass IT policy commands from the host system to the communication device 100. This can be done in a wireless or wired manner. These instructions can then be passed to the IT policy module 146 to modify the configuration of the device 100. Alternatively, in some cases, the IT policy update can also be done over a wired connection.

Other types of software applications can also be installed on the communication device 100. These software applications can be third party applications, which are added after the manufacture of the communication device 100. Examples of third party applications include games, calculators, utilities, etc.

The additional applications can be loaded onto the communication device 100 through at least one of the wireless network 200, the auxiliary I/O subsystem 112, the data port 114, the short-range communications subsystem 122, or any other suitable device subsystem 124. This flexibility in application installation increases the functionality of the communication device 100 and can provide enhanced on-device functions, communication-related functions, or both. For example, secure communication applications can enable electronic commerce functions and other such financial transactions to be performed using the communication device 100.

The data port 114 enables a subscriber to set preferences through an external device or software application and extends the capabilities of the communication device 100 by providing for information or software downloads to the communication device 100 other than through a wireless communication network. The alternate download path can, for example, be used to load an encryption key onto the communication device 100 through a direct and thus reliable and trusted connection to provide secure device communication.

The data port 114 can be any suitable port that enables data communication between the communication device 100 and another computing device. The data port 114 can be a serial or a parallel port. In some instances, the data port 114 can be a USB port that includes data lines for data transfer and a supply line that can provide a charging current to charge the battery 130 of the communication device 100.

The short-range communications subsystem 122 provides for communication between the communication device 100 and different systems or devices, without the use of the wireless network 200. For example, the subsystem 122 can include an infrared device and associated circuits and components for short-range communication. Examples of short-range communication standards include standards developed by the Infrared Data Association (IrDA), Bluetooth™, and the 802.11™ family of standards.

In use, a received signal such as a text message, an e-mail message, or web page download will be processed by the communication subsystem 104 and input to the main processor 102. The main processor 102 will then process the received signal for output to the display interface 110 or alternatively to the auxiliary I/O subsystem 112. A subscriber can also compose data items, such as e-mail messages, for example, using the keyboard 116 in conjunction with the display interface 110 and possibly the auxiliary I/O subsystem 112. The auxiliary subsystem 112 can include devices such as: a touchscreen, mouse, track ball, infrared fingerprint detector, or a roller wheel with dynamic button pressing capability. The keyboard 116 may be an alphanumeric keyboard and/or telephone-type keypad. However, other types of keyboards can also be used. A composed item can be transmitted over the wireless network 200 through the communication subsystem 104. It will be appreciated that if the display interface 110 comprises a touchscreen, then the auxiliary subsystem 112 may still comprise one or more of the devices identified above.

For voice communications, the overall operation of the communication device 100 is substantially similar, except that the received signals are output to the speaker 118, and signals for transmission are generated by the microphone 120. Alternative voice or audio I/O subsystems, such as a voice message recording subsystem, can also be implemented on the communication device 100. Although voice or audio signal output is accomplished primarily through the speaker 118, the display interface 110 can also be used to provide additional information such as the identity of a calling party, duration of a voice call, or other voice call related information.

The communication subsystem component 104 may include a receiver, transmitter, and associated components such as one or more embedded or internal antenna elements, Local Oscillators (LOs), and a processing module such as a Digital Signal Processor (DSP) in communication with the transmitter and receiver. Signals received by an antenna through the wireless network 200 are input to the receiver, which can perform such common receiver functions as signal amplification, frequency down conversion, filtering, channel selection, and analog-to-digital (A/D) conversion. A/D conversion of a received signal allows more complex communication functions such as demodulation and decoding to be performed in the DSP. In a similar manner, signals to be transmitted are processed, including modulation and encoding, by the DSP, then input to the transmitter for digital-to-analog (D/A) conversion, frequency up conversion, filtering, amplification and transmission over the wireless network 200 via an antenna. The DSP not only processes communication signals, but also provides for receiver and transmitter control, including control of gains applied to communication signals in the receiver and the transmitter. When the communication device 100 is fully operational, the transmitter is typically keyed or turned on only when it is transmitting to the wireless network 200 and is otherwise turned off to conserve resources. Similarly, the receiver is periodically turned off to conserve power until it is needed to receive signals or information (if at all) during designated time periods. Other communication subsystems, such as the WLAN communication subsystem 105 shown in FIG. 1, may be provided with similar components as those described above configured for communication over the appropriate frequencies and using the appropriate protocols. The particular design of the communication subsystem 104 or 105 is dependent upon the communication network 200 with which the communication device 100 is intended to operate. Thus, it should be understood that the foregoing description serves only as one example.

In some embodiments, the communication device 100 may comprise a touchscreen-based device, in which the display interface 110 is a touchscreen interface that provides both a display for communicating information and presenting graphical user interfaces, as well as an input subsystem for detecting user input that may be converted to instructions for execution by the device 100. The touchscreen display interface 110 may be the principal user interface provided on the device 100, although in some embodiments, the touchscreen interface 110 may be an auxiliary user interface, and additional buttons 212 (shown in FIGS. 3-5) or other input means may be provided.

In a touchscreen device, the device 100 may comprise a housing 210, which may be formed in one or more pieces using appropriate materials and techniques, such as injection-molded plastics. The display interface 110 is mounted in the housing 210, and may be movable relative to the housing 210. Generally, construction of the touchscreen and its implementation in the communication device 100 will be understood by those skilled in the art. Examples in the art include commonly-owned U.S. Patent Application Publication Nos. 2004/0155991, 2009/0244013, 2010/0128002 and 2010/0156843, the entireties of which are incorporated herein by reference. Briefly, a touch-sensitive display interface may comprise suitable touch-sensitive screen technology, such as a capacitive, resistive, infrared, surface acoustic wave (SAW) touch-sensitive display, strain gauge, optical imaging, dispersive signal technology, acoustic pulse recognition, and so forth, as known in the art. A capacitive touchscreen display includes a capacitive touch-sensitive overlay 214 that may comprise an assembly of multiple layers in a stack including, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO). An example of a touchscreen display interface 110 is described in aforementioned U.S. Patent Application No. 2010/0128002. Optionally, the device 100 may also provide haptic or tactile feedback through the housing of the device 100, or through the touchscreen itself In one embodiment, a transmissive TFT LCD screen is overlaid with a clear touch sensor assembly that supports single and multi-touch actions such as tap, double-tap, tap and hold, tap and drag, scroll, press, flick, and pinch. The touchscreen display interface 110 detects these single and multi-touch actions, for example through the generation of a signal or signals in response to a touch, which may then be processed by the processor 102 or by an additional processor or processors in the device 100 to determine attributes of the touch event, such as the location of the touch action, whether defined by horizontal and vertical screen position data or other position data. Touch location data may include an area of contact or a single point of contact, such as a point at or near a center of the area of contact. The touchscreen display interface 110 may be provided with separate horizontal and vertical sensors or detectors to assist in identifying the location of a touch. A signal is provided to the controller 216, shown in FIG. 1, in response to detection of a touch. The controller 216 and/or the processor 102 may detect a touch by any suitable contact member on the touch-sensitive display 110.

The detected touch actions may then be correlated both to user commands and to an element or elements displayed on the display screen comprised in the display interface 110. In response to the user command, the processor may take actions with respect to the identified element or elements. Touches that are capable of being detected may be made by various contact objects, such as thumbs, fingers, appendages, styli, pens, pointers and the like, although the selection of the appropriate contact object and its construction will depend on the type of touchscreen display interface 110 implemented on the device. Depending on the technology selected for the touchscreen display interface 110, the interface 110, by itself, may detect contact events on its surface irrespective of the degree of pressure applied at the time of contact. Pressure events, and varying degrees of pressure applied to the touchscreen display interface 110, may be detected using force sensors, discussed below.

FIG. 2 illustrates a cross-section of the device 100 shown in FIG. 3 at the line 2-2 (omitting other features of the device 100). The housing 210 is shown, with the touchscreen display interface 110 comprising a touch-sensitive overlay 214 disposed over a display screen 218. The interface 110 is disposed on a tray 220. The tray 220 is provided with spacers 222 which may be flexible and compressible components, such as gel pads, spring elements, foam, and the like, which may bias the touchscreen display interface against the force sensing assemblies, or limit the movement of the display interface with respect to the housing 210. Disposed below the tray 220 is a base 252, which may comprise a printed circuit board for electrically connecting each of one or more force sensors 270 disposed thereon with the processor 102 or a separate controller 216 in communication with the processor 102. The base 252, which may be mounted on the housing 210 by means of supports 254, may also provide support and electrical connections for one or more tactile feedback devices, such as piezoelectric actuators 260. The touch-sensitive display may thus be moveable and depressable with respect to the housing 210, and floating with respect to (i.e., not fastened to) the housing 210. A force F applied to the touchscreen display 110 would then move, or depress, the display 110 towards the base 252.

The one or more force sensors 270 are disposed beneath the display interface 110. The construction and implementation of the force sensors 270 will also be understood by those skilled in the art. The force sensor or sensors 270 may include force-sensitive resistors, strain gauges, capacitive, piezoelectric or piezoresistive devices, pressure sensors, or other suitable devices. For example, each force sensor 270 may comprise a piezoelectric sensor which, when deformed due to force applied through contact by the touchscreen display interface 110 when pressure is applied to the interface 110, transmits an electrical signal to the controller 216 or processor 102. The force sensors 270 may alternatively comprise a force-sensing resistor, wherein the resistance changes as force applied to the force sensor 270 changes. As applied force on the touchscreen display 110 increases, the resistance decreases. This change is determined via a controller for each of the force sensors, and a value representative of the force at each of the force sensors 270 may be determined. Thus, each force sensor 270, whether piezoelectric or resistive, may be capable of outputting a range of voltages according to the amount of force detected. If the signal is determined to be above a predetermined threshold, the signal may be interpreted as application of pressure on the touchscreen display interface 110 associated with particular actions or responses at the device 100 (such as actuating a user interface element determined to be located at the point at which the display interface 110 was depressed). Thus, with a touchscreen display interface 110 that is sensitive to contact by a contact means, the device 110 may be configured to detect not only contact (i.e., comparatively light pressure) at the touchscreen interface 110 surface using an overlying touch sensing layer, but also heavier pressure applied to the touchscreen interface 110 using the one or more force sensors 270. The output of the force sensor 270 may be digitized by a suitable analog-to-digital converter (which may be comprised in a controller associated with the force sensor 270), not shown. Thus, signals from the force sensors 270 that vary in time due to sequences of presses or continuous presses applied via the touchscreen surface may be detected and digitized. Force as utilized throughout the specification, including the claims, refers to force measurements, estimates, and/or calculations, such as pressure, deformation, stress, strain, force density, force-area relationships, thrust, torque, and other effects that include force or related quantities.

The piezoelectric actuators 260 may be positioned at one or more locations underneath the touchscreen display interface 110. Each actuator may comprise a piezoelectric element mounted on a substrate of a suitable material such as nickel, stainless steel, brass, and so forth. Each of the piezoelectric elements and substrate may be mechanically pre-loaded, and slightly bent while supported over openings in the base 252. The actuators 260 include a force sensor disposed on the substrate. The force sensor may include a force-sensitive resistor, strain gauge, pressure sensor, capacitive, or other suitable device including a piezoelectric or piezoresistive device. These actuators 260 may be electrically connected to the controller 216 or processor 102 via the base 252, and may be used to apply force to the touchscreen display interface 110 in response to a received signal, such as a signal generated as a result of the touchscreen interface 110 being depressed by a predetermined amount.

In the examples of FIGS. 3 and 4, discrete force sensors 270 are disposed in a rosette pattern, although any other suitable pattern may be utilized, including, for example, single force sensor patterns, multiple force sensor patterns, multi-directional patterns, stacked or planar configurations, patterns of other shapes, and so forth. With a smartphone or other communication or data processing device 100 with a substantially rectangular display interface 110, at least one force sensor may be disposed generally proximate to each corner of the interface 110. It will be understood that the same or different distribution patterns and the same or a different number of force sensors 270 may be used for different communication device 10 form factors. For example, a device 100 with a larger display area, such as a tablet computer, may have a greater number of force sensors 270. Each of the individual force sensors 270 may be electrically coupled to one another and to a force sensor controller (not shown) or to the processor 102, such that a change in resistance or force, due for example to pressure applied on the display interface 110, sensed at any one of the force sensors 270 may generate a signal to the controller 216 or processor 102. If the sensors 270 are coupled to each other, then the location of the detected change in resistance or force may not be discernible by the processor. If the force sensors 270 are electrically isolated and separate conductors connect each individual force sensor 270 to the controller or the processor 102, the force sensor 270 detecting applied force may be identified from among the group of force sensors 270.

Multiple force sensors 270 disposed within the communication device 100 may be logically grouped into one or more sensing regions. Examples are provided in FIGS. 3 and 4. The phantom lines in FIG. 3 illustrate five logically defined sensing regions 275a, 275b, 275c, 275d and 275e. Each sensing region is associated with two force sensors 270. Thus, when pressure is applied to the surface of the display interface 110 in the vicinity of one of the force sensors 270, the force sensor 270 nearest the location at which the pressure is applied may detect the greatest force and transmit a signal accordingly to the controller or processor 102. If the force sensor 270 is adapted to measure the amount of force applied at or near the sensor, the sensor 270 may transmit a signal to the controller or processor indicating the amount of force applied. If the detected force is greater than a predetermined level, it may be positively identified as a pressure event. If the sensor 270 is configured to detect forces at multiple levels, it may provide distinct signals to the controller or processor 102 to indicate when an applied force has been detected above a first, a second, and optionally a third or further predetermined level. The controller or processor 102 may thus identify detected pressure events as heavier or lighter presses.

FIG. 4 illustrates another arrangement of the sensing regions, in this case six, 280a, 280b, 280c, 280d, 280e, and 280f. It can be seen in this example that a different number of force sensors 270 is logically assigned to each of the sensing regions. Each of the force sensors 270 depicted herein has a substantially rectangular shape; however, the force sensors 270 may take any suitable shape, and the number and arrangement of the force sensors 270 in the device 100 may assume any suitable number and geometry. Similarly, the actuators 260 may have any suitable number, configuration or arrangement. More or fewer sensing regions may be logically defined in association with the force sensors 270, or with the actuators 260, and conversely, one or more force sensors 270 or actuators 260 may be associated with a given defined sensing region. It will be appreciated, however, that a communication device 100 provided with both force sensors 270 and a suitable touchscreen, such as a capacitive touchscreen, may detect not only contact or light touches at given locations of the touchscreen surface, but also applications of greater force on the touchscreen. The applied force may be detected as being localized in a specific region or area of the touchscreen, or else simply detected as having been applied, and correlated to a specific region or area based on the location of the detected contact on the screen.

If the detected pressure event may be localized by the force sensors 270 within the device 100, the pressure event may be associated with an entire sensing region associated with that force sensor 270. Thus, the processor 102 may interpret a signal from a force sensor 270 indicating a press as an instruction to invoke an action or command in respect of any displayed content in the sensing region associated with the force sensor 270. In some cases, pressure may be continuously applied across the touchscreen, rather than localized in one particular location. The pressure event may therefore be detected by multiple force sensors 270 and may be associated with one or more sensing regions. The detected event may therefore be interpreted by the processor 102 as a command invoking user interface elements displayed on the touchscreen display 110 either within each of the affected sensing regions, or along the path traced by the applied force.

FIG. 5 illustrates a further type of force sensor 290, which comprises a force sensor in a continuous, serpentine pattern. The force sensor 290 may be disposed below the touchscreen display interface 110, but electrically isolated from the touch sensor used to detect contact on the touchscreen display. The force sensor 290 is electrically connected to the controller or processor 102. The force sensor 290 thus provides coverage of a substantial area of the display. The sensor 290 may comprise one of the materials identified above. A touch imparted on the touchscreen display interface 110 with sufficient force may cause the force sensor 290 to undergo an electrical change, which may be due to a change in the geometry of the material of the sensor 290 due to displacement or distortion, and a change in resistivity as a result of the applied pressure.

If a detected pressure event cannot be localized on the touchscreen by the controller or processor 102, then the location of the pressure event may be determined based on detection of the location of contact by the touch-sensitive component of the touchscreen display interface 110. Accordingly, the detection and localization of the pressure event comprises two steps: a detection, by the touchscreen display interface 110 and its associated controller or the processor 102, of the location of contact on the touchscreen; and a detection of applied force on the touchscreen display interface 110. With these detected events, the processor 102 or the controller may determine that a pressure event is occurring at the location of contact.

In a further embodiment, the communication device 100 may be provided with a physical keyboard 116 comprising a plurality of keys that may be actuated (e.g., depressed) by a user. The physical keyboard thus serves as the input interface for the communication device 100. In particular, the device 100 may be configured to receive password input via the keyboard 116. Force sensors 270 may be incorporated into the keyboard 116 assembly, or otherwise positioned in the device so as to permit detection of applied force at the physical keyboard 116. Thus, if one or more of the force sensors 270 detects an application of pressure greater than a predetermined threshold that is necessary for text input, the device 100 may interpret this as a pressure event.

As noted above, a password may be used to secure access to the device 100. Consequently, access to the password is typically restricted as well; users may be cautioned to select a complex password that is more resistant to dictionary or brute force attacks, in which an attacker tries a series of password attempts based on a dictionary file or other source of possible alphanumeric or ASCII character combinations. Users may also be cautioned to commit a password to memory, and to not write it down so as to prevent an attacker from discovering the password in the user's personal effects, and to guard against spoofing attacks in which an attacker poses as a trusted party in an attempt to obtain personal or security information. Many of the means for attempting to obtain a user's password or other security credentials are typically carried out either by deceiving the user, or without the user's knowledge; however, in some cases, an attacker may resort to a direct attempt to force the user to provide the password or other information directly, and knowingly, to the attacker. Such cases typically involve some form of duress, either in the form of physical harm, the threat of physical harm, or some other type of coercion. In such duress scenarios, the user may be compelled to give up the desired information by entering the password directly on the communication device 100 in the presence of the attacker. The attacker may then take possession of the device 100.

Thus, it may be desirable for the user to take certain steps if a duress situation is suspected. For example, the user could initiate encryption of the data on the device, initiate a wipe of the device 100, or otherwise initiate a procedure to corrupt the data, so as to render inaccessible any sensitive data that may be compromised by the attack. However, under the circumstances the user may not have any opportunity to take these steps, as the attacker may be observing the user. The device 100 could therefore be configured to surreptitiously and automatically initiate deletion or encryption, or take some other duress response step, such as transmitting a message requesting assistance from law enforcement, or even executing a pre-programmed simulation to make it appear that the device 100 is broken and unable to access its data stores. Implementing these duress responses, however, still generally requires the user to indicate to the device 100 that a duress situation is suspected or occurring.

One method of indicating a duress situation to the device 100 is to designate a special key or key combination that may be pressed by the user. However, if the attacker is observing the user's actions, the action of actuating the key or key combination may be detected. Another solution is to have the user enter a password that does not match the actual password for the device 100. For example, if the password used for the device 100 is a simple sequence of letters and/or numbers, one option is to designate a variant of the password as a special duress password, which when input at the device 100, initiates a duress handling procedure at the device. In this example, if the password was a four-digit sequence, then the special duress password may be a rotation of the PIN digits (e.g., if the PIN is '1234', the duress password would be '2341'). As another example, duress may be signaled by the user entering the usual password on the keyboard, but preceded or followed by an additional key press that indicates duress.

As noted above, in a touchscreen device the touchscreen may be the primary input means or interface of the device 100. Further, the touchscreen device is typically capable of detecting gestures and other contact events. Thus, a symbol or gesture that is traced over all or part of a surface of the touchscreen may be used in place an alphanumeric password that is entered using a keyboard or virtual keyboard on the device 100. The touch-sensitive component of the touchscreen display interface 110 may detect the path of contact traced by a user's finger, thumb, stylus or other contact device on the surface of the display interface 110, and attempt to match the detected path with information already stored at the device 100 to determine if the input password corresponds to a previously stored password. The stored information in this case may represent touch sensor data identifying a predefined path. If the detected path matches, or substantially matches, the stored information, then the device 100 may permit access to the device's functions and data. Such symbol passwords need not be a single, continuous line traced on the touchscreen; they may include a plurality of line segments or disconnected touches, and may include multitouch contact or gestures in which more than one digit contacts the touchscreen while the symbol is traced.

Figure 6A:
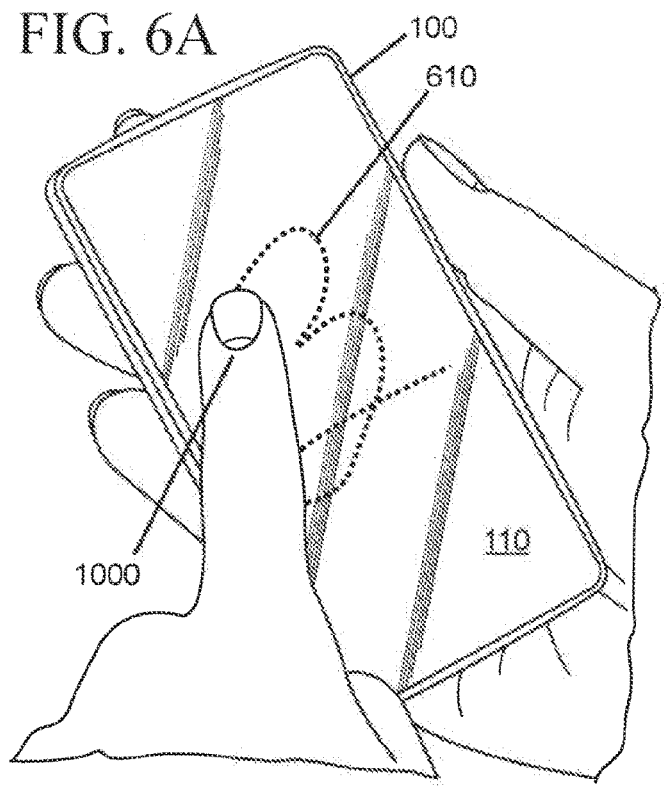
FIGS. 6A and 6B are illustrations of an exemplary touchscreen communication device held by a user during password entry.
Figure 6B:
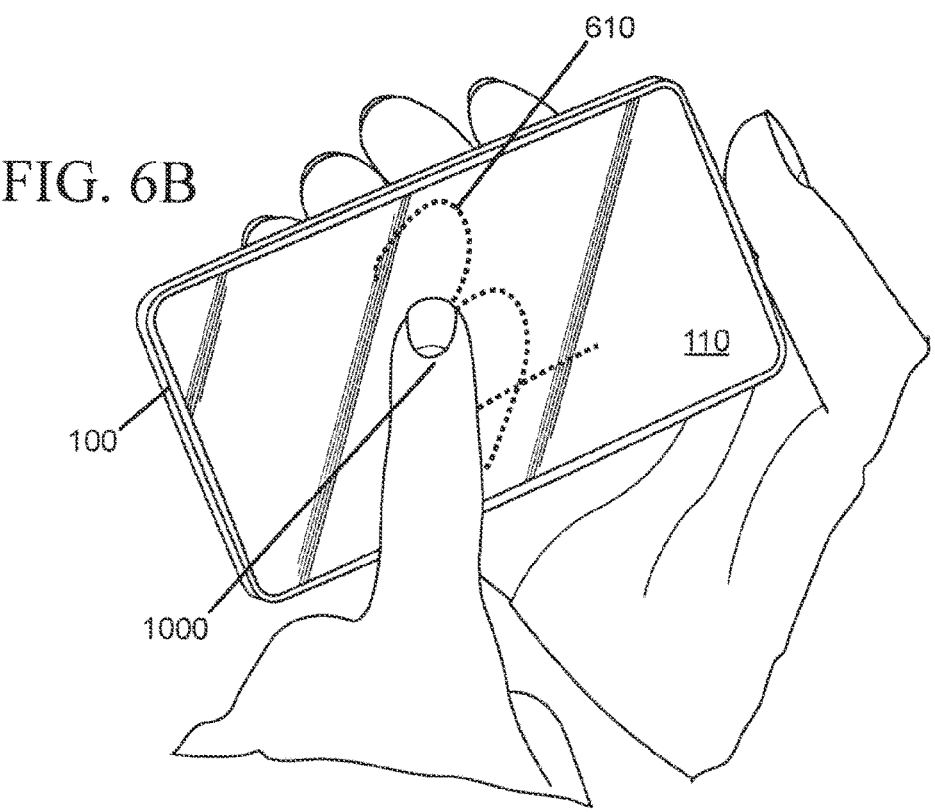
Figure 7A:
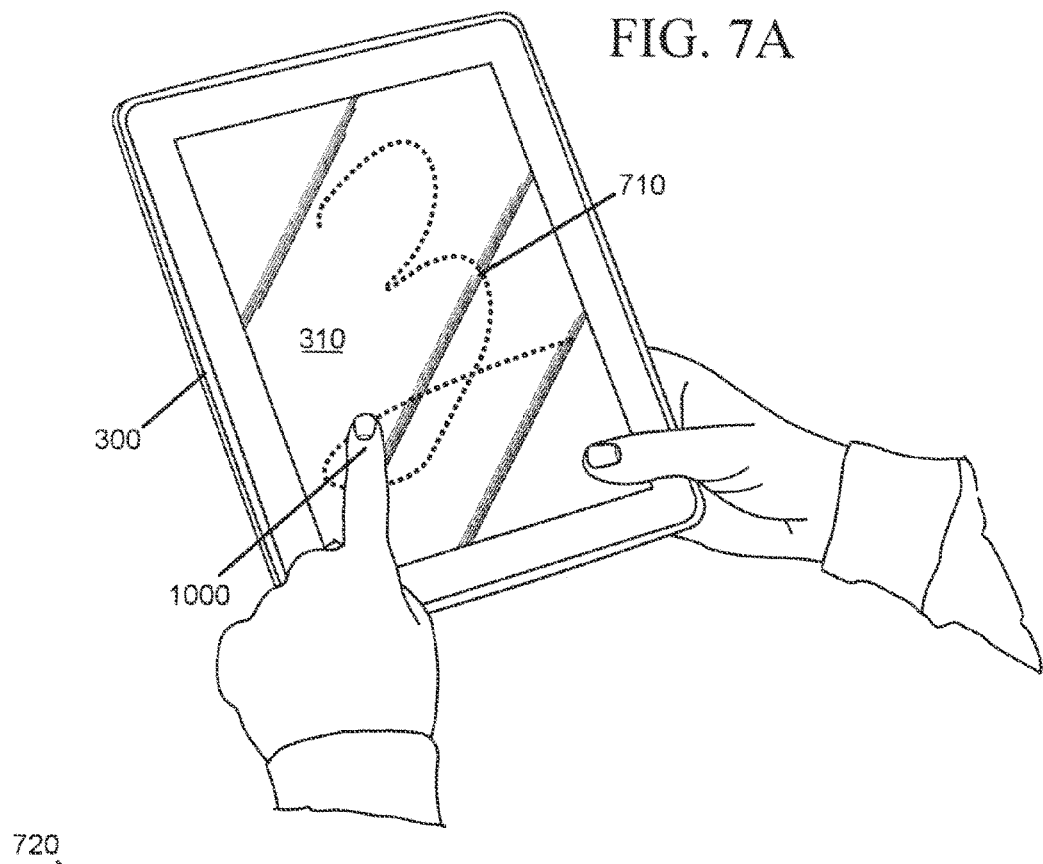
FIGS. 7A and 7B are further illustrations of an exemplary touchscreen communication device held by a user during password entry.
Figure 7B:
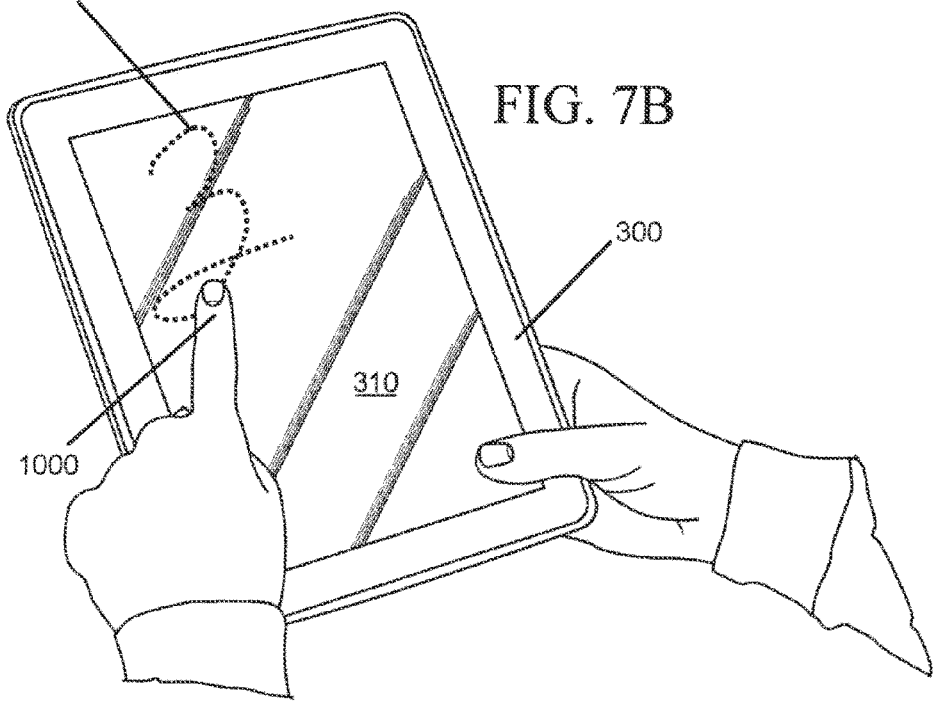

FIG. 6A illustrates a touchscreen communication device, such as a smartphone, MP3 or other audio or video player, or other small handheld data appliance. The device 100 in FIG. 6A is generally rectangular in shape, and held in a first orientation (a "portrait" orientation). In the example of FIG. 6A, a user's finger 1000 is illustrated tracing a path 610 on the surface of the display interface 110 of the communication device 100. The path 610 may represent a symbol that is used as a password input by the user in order to gain access to device 100 functions and data. Similarly, FIG. 6B illustrates a similar device 100, held in a second orientation (a "landscape" orientation), and a user's finger 1000 tracing a similar path 610 on the surface of the display 110. FIG. 7A shows another touchscreen device 300 that may be larger in size, such as a tablet computer, e-book reader, or other similar device 100, also held in a portrait orientation. In FIG. 7A, the user's finger 1000 is shown tracing the path 710 covering a substantial portion of the screen 310. However, if the screen of the device 300 is generally larger than the user's hand, the user's gestures in tracing the path 710 may appear exaggerated; observers may notice that the user is apparently entering a password, and the relatively large movement by the user's hand and finger may enable an attacker to engage in "shoulder surfing", i.e., to observe the user's password as it is entered without the user realizing he or she is being observed. Thus, FIG. 7B illustrates a similar symbol path 720 being traced by the user's finger 1000 on the device 300, but this time only in one quadrant of the touchscreen display 310. By restricting the size of the path 720 in this manner, the user's actions in tracing the symbol on the touchscreen 310 may attract less attention. The foregoing are thus examples of symbol passwords that may be used with a touchscreen device 100, 300. While the discussion herein references the first form factor of the communication device 100 specifically, it will be appreciated that it applies equally to other form factors, such as the communication device 300.

The paths 610, 710, 720 are relatively simple, consisting of a single generally curved path. Symbol passwords may be rendered more complex with multiple line segments or multiple paths, dots, and combined straight edges and curves. FIG. 8A illustrates another example of a symbol password that may be traced on the display of the communication device 100 (here, the examples are shown on a smartphone form factor, but it will be readily appreciated by those of ordinary skill in the art that they may be implemented on a larger device 300). The symbol in FIG. 8A includes three components: a first line 810, a disconnected loop 820, and a series of four dots 830. If such a complex symbol is used as a password, the device 100 may require that the various elements 810, 820, 830 be traced on the device display 110 in a consistent order for the password to be validated. Thus, in the example of FIG. 8A, the first curved line 810 would then be traced on the display 110 first, followed by the loop 830, and finally the dots 830, as indicated by the numerals adjacent the various elements. FIG. 8B illustrates a further example of a symbol password, as it may be traced on the display of a smartphone. The symbol path 850 is substantially continuous, but combines different elements such as spirals, straight edges, and a curve. FIG. 9 illustrates still a further example of a symbol password 910 that may be traced on a communication device 100 held in the second (i.e. landscape) orientation, in which substantially all of the width of the touchscreen 110 is filled with the symbol. In some embodiments, the communication device 100 may be configured to accept a password entered via the touchscreen 110 only while the device 100 is in a specific orientation (e.g., either landscape or portrait). In other embodiments, the communication device 100 may be configured to accept and validate a symbol password detected via the display 110 regardless of device orientation.

Figure 10:
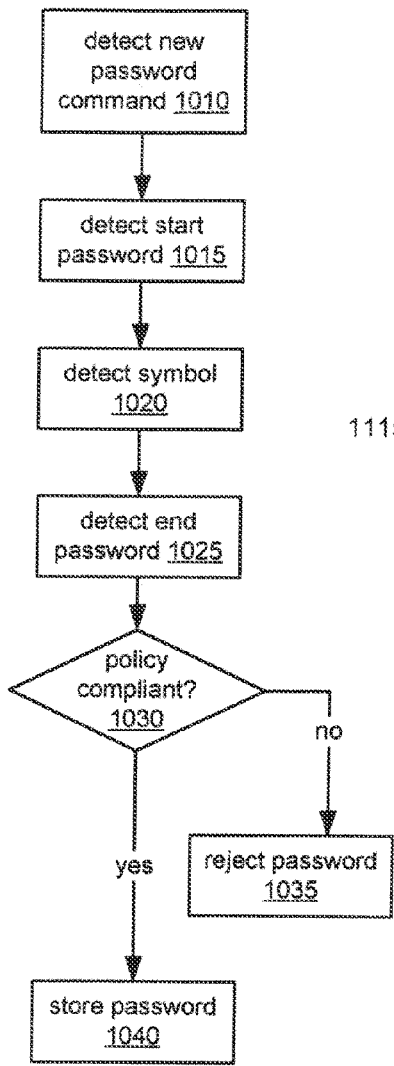
FIG. 10 is a flowchart of an exemplary method for storing a password.

A symbol password may be set generally in accordance with the process illustrated in FIG. 10. At 1010, an instruction to set a new password is received or a command to set a new password detected. The instruction may be received via a user interface; for example, a user or an administrator may force a new password to be set. The instruction may also be automatically initiated as a result of a determination that a current password set at the device 100 has aged past a predetermined threshold, which may be set by an information technology (IT) or security policy for the device 100. For example, a policy may be set requiring the user to create a new password every thirty or forty-five days.

Figure 11:
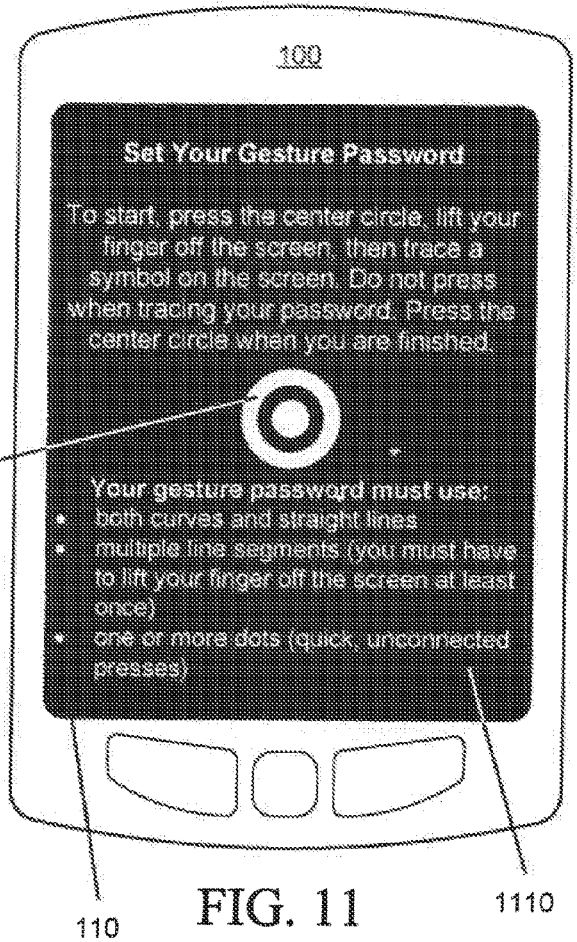
FIG. 11 is an illustration of an exemplary user interface displayed on the communication device of FIGS. 2 to 4.

The instruction or command thus initiates data collection at 1015, via the touchscreen display interface 110 due to contact detected via the interface 110. As a precursor to actual data collection, the device 100 may be first configured to detect a "start" command or signal, which may be input by the user as a positive indicator that the input subsequently received via the display 110 is to be recorded as a new password. The exemplary user interface 1110 shown in FIG. 11 is an example of an informational and data gathering screen that may be displayed to the user prior to data collection. In this example, the user is directed to press a target area on the display 110 to signal that new password entry is about to begin. The user is also directed to lift his or her finger off the display after pressing the target but prior to beginning password entry, so that the processor 102 may distinguish between the "start" signal and the actual password entry.

Returning to FIG. 10, the device 100 therefore enters a data collection or symbol detection mode at 1020, during which the device 100 collects data resulting from the user's input of a password at the device 100. The input password may be a symbol traced on the touchscreen display interface 110. As noted above, the symbol traced may comprise a single continuous line, a plurality of lines, and other touches such as dots. The user need not apply significant pressure to enter the password; with a capacitive touchscreen display, for example, mere contact with minimal force on the screen may be detected by the device 100. In some embodiments, while the password is traced on the display interface 110, the display interface 110 may be blanked and not display any information to the user. In other embodiments, the display interface 110 may display guidelines or other visual cues to assist the user in recalling the placement of the symbol on the display 110.

At 1025, an end to the password entry is detected by the device 100. While the end of password entry may be detected by a determination that input has ceased to be received via the touchscreen display interface 110 (e.g., the device 100 may detect that no new input has been received via the display interface 110 for a predetermined period of time, such as three seconds or a longer or shorter period of time), in some embodiments the user may be required to positively indicate that password entry is complete. In the example of FIG. 11, the user is required to again press the target area 1115 to signify that password entry has ended. Alternatively, the user may be required to press or touch another input interface on the device 110, such as a button, to signify the commencement of password entry, the termination of password entry, or both. Once the password entry has been determined to be complete, the device 100 stores data representative of the symbol input and detected via the touchscreen display interface 110. The data will represent the path represented by the symbol, for example expressed in x-y coordinates with reference to the orientation of the device 100 at the time the password was entered. This x-y data may be stored in any suitable format at the device, for example concatenated as a single string.

It will be appreciated by those skilled in the art that the password information subsequently stored need not be stored literally as a series of x-y coordinates. For example, the detected input may be processed to represent the symbol using one or more geometric primitives such as points, lines, curves and polygons, and data relating to the primitives may be stored instead. The data may or may not include timing data, such as the time elapsed from the detected beginning to the detected end of the password entry, or the time elapsed for completion of each segment of the password, if the password comprises multiple disconnected touches, such as in the example of FIG. 8A. Other suitable methods of processing user-input data of this nature will be known to those skilled in the art. The password data may or may not be stored in association with corresponding pressure data, i.e. data representative of a level of force applied by the user while entering the symbol password.

Figure 12:
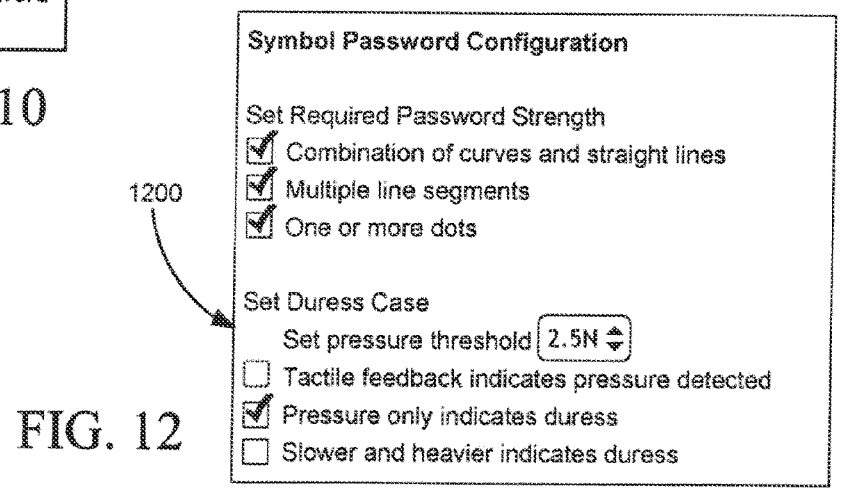
FIG. 12 is an example of a user interface for configuring passwords.

At 1030, the device 100 may determine whether the detected password symbol is compliant with any security or IT policy implemented for the device 100. As with ASCII-based passwords, for example, a specific level of password complexity may be required, as noted above. Thus, the user may be required to use symbols or gestures comprising one or more of curves, straight lines, multiple line segments or discontinuities, or "dots" (single, quick touches or presses on the display interface 110 without moving the position of the finger or thumb along the display interface 110). The device 100 may also require that the symbol comprise multitouch gestures, in which more than one digit is in contact with the display 110 at a given time. For example, the user may be required to trace a line with a finger while a thumb of the same hand is in contact with the touchscreen in a specific location. FIG. 12 illustrates an exemplary interface 1200 for use in establishing security policy rules for setting the symbol password, which permits the selection of options such as combinations of curved and straight lines, multiple line segments, and one or more dots.

If the detected password is determined to be policy-compliant, then at 1040 the password is stored. The data may be stored in an encrypted form in the memory 108 of the device. If the detected password is determined not to be policy-compliant, then the password is rejected at 1035. The user may then be requested to re-attempt new password entry.

Subsequently, the next time the user attempts to gain access to the device 100 functions and data, the user may be required to enter the symbol password previously defined as above. The user may be provided with a visual or audible prompt to enter the password, and optionally prior to entering the password, the user may be required to provide some other input to indicate to the device that he or she intends to enter a password. For example, the user may be required to touch a particular button 212 to signify that he or she wishes to commence password entry; in response to this input, the device 100 may enter a password receiving mode. For password entry, the device 100 may display a blank screen to the user, or as mentioned above, may display some visual guide or cue to assist the user in positioning the symbol on the display interface 110. The user may then enter the symbol password via the touchscreen display interface 110. Once the symbol password entry has been determined to be complete, the device 100 may then compare the entered symbol to the stored symbol password data, and permit access according to the results of the comparison. Comparison of the newly entered password against previously stored password data, in the context of a symbol password, may be carried out using techniques similar to those generally known in the art for recognizing gestures input via a touchscreen interface.

When a password is subsequently re-entered via the touchscreen interface 110, even by the authorized user, slight variations in the symbol traced may be introduced. The device 100 may be configured to accept the password as valid provided these variations fall within a predetermined tolerance. The tolerance may simply be defined as a specific radius or margin of error on either side of the lines defined in the originally entered password symbol; provided the re-entered password symbol is within this margin, it may be deemed a match.

In other embodiments, tolerances may be computed according to other factors. For example, the first stroke 810 in the symbol shown in FIG. 8A may be defined as a simple curve having a first length, arc, and direction. While the stroke 810 may also be associated with a starting and ending position on the display, expressible as an x-y coordinate, the device 100 may be configured to accept any input stroke substantially in compliance with the defined arc and direction provided the input stroke commences and ends within a defined radius of the associated starting and ending position. Consequently, some tolerance in length of the first stroke 810 may be implied. Similarly, if the arc within the first stroke 810 is defined in relation to one or more radius values, an input stroke may be deemed to be within tolerance if its radius value is within a specific range around the defined radius value. Additionally, some tolerance may be applied in the relative positioning of discrete strokes within the symbol. The second stroke 820 shown in FIG. 8A, for example, may be defined as intersecting or contacting the first stroke 810 at a specific point of the first stroke 810. The position of an input second stroke may be deemed to be within tolerance if it contacts the input first stroke within a defined distance of the previously defined point of contact.

Tolerances may also be defined with respect to the timing of the symbol password entry, if timing data is stored in respect of the password. For example, the time elapsed in entering the password must match the time elapsed in entering the originally stored password, within a predetermined tolerance such as ±0.5 second; or else the time elapsed in entering the password must not exceed the amount of time taken to enter the original password, again within a predetermined tolerance. Similarly, if the symbol password comprises multiple segments or touches, each individual segment or touch may be required to be completed within a specified period of time based on the recorded times elapsed in respect of these segments or presses when the password was originally entered. Because it is possible that an attacker, attempting to mimic the password, may have a different pace in tracing the password symbol or actuating the appropriate keys, this time constraint may permit detection of unauthorized password attempts on the device 100. Generally, methods of performing a match between an entered symbol and previously stored symbol data, with or without tolerances, will be known to those of ordinary skill in the art.

If the touchscreen display interface 110 is adapted to detect the symbol password entry without requiring the user to apply significant force to the display interface 110—for example, in the case of a capacitive touchscreen display—the user is not required to make effort to apply any particular level of force to the touchscreen display interface 110 while entering the password. However, if the device 100 is also equipped with a force sensor or sensors 270, the application of force may be used to identify a duress situation. To indicate to the device 100 that the password is being entered under conditions of duress, the user may simply enter the same, predefined password, but press harder on the display interface 110 than normally for the entire duration of password entry or for a portion thereof. The device 100 may detect the applied force and interpret the password entry as a duress signal, and take any predefined action in respect of the duress signal. Alternatively, duress may be indicated to the device 100 when the password is entered with less force than associated with normal password entry.

An example of the process that may be followed by the device 100 in receiving an entered password symbol for the purpose of verification and permitting access to the device 100 is shown in FIG. 13. At 1300, the beginning of password entry is detected. As discussed above, this may be a specific input received from the user, such as a button press, that password entry is about to begin. The input may also be a touch or gesture on a specific area of the touchscreen display interface 110. In other embodiments, there may not be any specific command or input received from a user to indicate that password entry is about to begin. For example, if the device 100 is in a locked state, in which access to functions and data is generally not permitted unless a password is entered, any manipulation of any user input system on the device 100—whether a button press, scroll wheel movement, or contact on the touchscreen display interface 110—may place the device in a password detection mode.

At 1305, the device 100 enters a password detection or receiving mode, and detects the password input via the touchscreen display interface 110. At the same time, pressure or force data is also collected by the force sensor or sensors 270 for at least a portion of the password entry duration. At 1310, the end of password entry is detected, for example by detecting that contact between the user's digit or the contact tool and the touchscreen has been broken, or that a predetermined period of time has passed since any input was received by the device 100. At 1315, the received input data representing the password is converted to an appropriate digital representation. As discussed above, this may include the generation of data based on the x-y representation of the symbol, or the generation of geometric primitive data, optionally together with timing data. A data representation based on the detected force data collected by the force sensor or sensors 270 is also generated. If the force sensor or sensors 270 are configured to only detect applied force on the touchscreen display 110, but not localized to any particular place, the data generated may be an average value for all force data collected during password entry. Alternatively, an average force value may be generated for each segment of the symbol entered during the password receiving mode. In the foregoing embodiment, the password is input using a touchscreen input interface. In this embodiment, the input password need not be a symbol; it may be a path or sequence of key presses on a virtual keyboard displayable on the touchscreen interface 110. In the alternative, the input interface used to input the password may be a physical keyboard 116. In this alternative embodiment, the password may comprise alphanumeric content, rather than a shape or symbol. In one embodiment, the force sensors 270 may be positioned so as to detect pressure applied to a keyboard 116, and the password itself may be an alphanumeric string that can be entered using a keyboard. Thus, the password detection by the device in block 1305 of FIG. 3 may comprise detecting input of an alphanumeric string using the keyboard.

At 1320, it is determined whether the received password, as represented by the digital representation, matches the previously stored password information, in accordance with any tolerance or timing constraints as discussed above. If there is no match, then access to the data and functions of the device 100 is denied at 1325. If there is a match, however, it is then determined whether the applied force or pressure during the password entry was above a predetermined threshold at 1330. This determination may be carried out using the data generated based on the force data collected during password entry; for example, if the average force value, computed over the entire duration of password entry, exceeds a predetermined threshold, then a duress condition is identified at 1340. Alternatively, if the force value during any one or more segments or portions of the input password, or during some predefined minimum period of time during the password entry, exceeds a predetermined force value, then the duress condition may be identified at 1340. For example, if additional force is detected during at least half of the time elapsed in entering the password, the device may identify this as a duress condition. The device 100 may invoke any predefined duress procedure upon identification of the duress condition at 1340. If no force above a predetermined threshold is detected, then at 1335 access to the device is allowed. The predetermined threshold of applied force may be defined a number of ways. In a first embodiment, any force detected by the force sensor or sensors 270 may constitute a detection of force above the predetermined threshold. In a second embodiment, a threshold value may be expressly set in a security policy. The interface 1200 of FIG. 12, for example, provides an option for an absolute force value to be set as the predetermined threshold. In a further embodiment, the user may train the device 100 to recognize a duress password. For example, when a new password is set at the device 100, the user may be required to enter the password once in a "normal" state, with minimal applied force, and then a further time in a duress state, with a user-selected level of applied force.

Similarly, if the password is a string to be entered via a keyboard 116 as described above, after receipt of the password it may be determined whether additional force was detected during the course of password entry. This additional force may result from additional pressure applied to one or more keys on the keyboard 116. In a further embodiment, described with reference to FIG. 14, the determination of a duress condition is carried out prior to completion of password entry. At 1400, the beginning of password entry is detected at the device 100, and at 1405 detection begins of the password input. At 1410, during password entry, a determination is made whether applied force during the password entry is above a predetermined threshold. This determination may comprise a continuous monitoring of the output of the force sensor or sensors 270 to detect a signal or value above a predetermined level, or to detect that this elevated signal is received for longer than a predetermined period of time. In this variant, it is thus possible that the user may not have started to enter the password with additional applied force, but then commenced applying the force during the course of password entry.

If there is a determination during the course of password entry that additional force has been applied, then a duress flag may be set at the device at 1425. Optionally, however, the user may be given an opportunity to cancel the duress password entry. Upon detection of the additional applied force, first, at 1415, feedback is provided to the user to indicate that the device 100 had detected a duress condition. At 1420, the device determines whether it has received an instruction to cancel the current password entry received so far, and to reset the password entry process. The feedback at 1415 may be provided discreetly; for example, a flickering pixel or other small indicator may be displayed on the touchscreen display interface 110. Alternatively, if the device is equipped with tactile actuators 260, the device 100 may provide feedback by slightly vibrating or pulsing the screen; this response may be detected by the user as an indication that the device considers the currently entered password to be entered under duress. If the user detects the response of the actuator 260 and does not intend to enter a duress password, then the user may break contact with the touchscreen display interface 110 and cease entering a password so as to cause a password entry reset. While a malicious user may use this feedback mechanism to attempt to reconstruct a password, coupled with other limitations on incorrect password entry (e.g., configuring the device 100 such that a predetermined number of unsuccessful password entry attempts in a row will result in wiping the device 100) the possibility of this reconstruction is reduced.

If there is no determination of applied force above a predetermined level, then at 1430 the end of password entry is detected, and the device 100 attempts a match between the received password and the stored password data, as described above. If the match is unsuccessful, then access is denied at 1445. If the match is successful and no duress flag was previously set at 1425, then access to the device is permitted at 1455. If the match is successful but the duress flag had been previously set, then the device 100 may interpret this password as a duress password, and enter the duress condition at 1460 and take any predefined action in respect of duress.

In a further embodiment, timing data may be used to confirm whether a duress condition exists. As noted above, timing data, such as the time elapsed in tracing a symbol or in actuating the keys corresponding to the password, may be determined and stored. Since applying additional force to the touchscreen display interface 110 increases the normal force at the surface of the display interface 110, friction between the user's digit or contact tool and the display interface 110 may increase, causing the password entry to be slower. A marked increase in the amount of time required to compete the correct password may be used to confirm that a duress condition exists. Alternatively, the time elapsed during password entry may be used to distinguish between a normal password and a duress password, even without using a detection or measure of applied force to determine whether a duress password had been input. For example, when the password is initially set at the device 100 (as it may be with reference to the process illustrated in FIG. 10), timing data associated with the password may be stored at the device 100 as well. When password entry is subsequently detected at the communication device 100, the time required to complete the subsequent password entry is compared to the timing data. If the subsequent password entry time generally matches the stored timing data (for example, within a given tolerance), no duress condition is identified. However, if the subsequent password entry time is significantly greater or less than the stored timing data (for example, ±10%) while the password itself that was input otherwise matches the stored password data, a duress condition is identified. The variance between the subsequent password entry time and the stored timing data may be fixed by means of the IT policy or a setting at the communication device 100.

By defining the duress password as the same password, but simply entered on the touchscreen display 110 or keyboard 116 with greater applied force than the usual, non-duress password, the user is not required to remember any extra data (such as an extra code or series of key presses) in order to trigger a duress condition at the device 100. It is only necessary for the user to recall that pressure should be applied while entering the password. This is beneficial since in a real duress situation the user may panic and not recall the extra steps to be taken. As described in one embodiment above, the device 100 may compute the average force applied during entry of the password, or may determine that a duress condition exists provided at least a portion of the password is entered with additional applied force. In that case, the user may commence entering the password symbol with the normal amount of force (e.g., only the amount of force sufficient for contact to be detected by the touchscreen display 110), then partway through symbol entry, apply additional force detectable by the force sensor or sensors 270 in the device 100. The device 100 may still interpret the password entry as a duress password because at least a portion of the symbol was determined to have been entered using additional applied force. Thus, even if the user initially forgot, under the stress of the duress situation, to begin entering the duress password, he or she can still trigger the duress condition at the device 100 by applying additional force partway through the password entry.

Furthermore, to an attacker that had previously seen the user enter the correct, non-duress password and was aware of the general parameters of the password but not the exact symbol shape or key sequence, the user's entry of the duress password will substantially resemble entry of the normal, non-duress password. Thus, the user's actions in entering the duress password may not trigger any suspicion that the user was engaging in behavior other than simply entering the non-duress password. In addition, in the case of a symbol password, because the duress and non-duress password are associated with the same symbol, symbol shape data need only be stored at the device 100 in respect of one shape. It is not necessary for the device 100 to maintain separate duress password symbol data. Also, because the duress password and the non-duress password share the same symbol shape, it is not necessary for the device 100 to engage in two symbol-matching processes in order to distinguish between a duress password entry and a non-duress, incorrect password entry. For example, if the duress password had been different, then the device 100 would have to first determine whether the entered symbol matched the stored non-duress password symbol, and if not, whether the entered symbol matched the stored duress password. Because the duress and non-duress passwords in the above embodiments follow the same pattern, only one matching process is necessary; if there is a match, there need only be a determination that additional force was applied during password entry.

Further, if the device 100 provides tactile feedback during password entry to indicate that it has flagged the password entry as a duress password due to the detected applied force on the display 110, the user may be alerted to cease password entry before completing the password if the applied force was unintentional. This may reduce the incidence of accidental duress password entry at the device 100.

The password requirements and policy may be set at the communication device 100. However, these settings may be configured remotely, at a host system in communication with the communication device 100. The host system may be associated with a corporate enterprise or other local area network (LAN), but can also be a home office computer or some other private system, or a server maintained by a telecommunications provider for example, in variant implementations. The communication device 100 may be in communication with the host system over a LAN or wireless LAN, or over a public or private network. The public or private network may be accessed via the wireless network 200. Data from the host system may be transmitted to the communication device 100 over the LAN, WLAN, or other network. In other embodiments, the communication device 100 may be physically connected to the host system via a cradle, which can be coupled to a device such as the user's computer. The cradle facilitates the loading of information (e.g. PIM data, private symmetric encryption keys to facilitate secure communications) to the communication device 100, and can be particularly useful for bulk information updates often performed in initializing the communication device 100 for use, or for updating information technology policies at the device such as password settings. The host system may include an IT Policy editor and server, as well as other software components for allowing an IT administrator to configure the communication devices 100 registered with the host system. The IT Policy may set rules for passwords, as mentioned above, as well as other configuration settings for communication devices 100, such as auto signature text, WLAN/VoIP/VPN configuration, other security requirements (e.g. encryption algorithms), specifying themes or applications that are allowed to run on the communication device 100, and the like.

The systems and methods disclosed herein are presented only by way of example and are not meant to limit the scope of the subject matter described herein. Other variations of the systems and methods described above will be apparent to those in the art and as such are considered to be within the scope of the subject matter described herein. For example, it should be understood that steps and the order of the steps in the processing described herein may be altered, modified and/or augmented and still achieve the desired outcome.

The systems' and methods' data may be stored in one or more data stores. The data stores can be of many different types of storage devices and programming constructs, such as RAM, ROM, flash memory, programming data structures, programming variables, etc. It is noted that data structures describe formats for use in organizing and storing data in databases, programs, memory, or other computer-readable media for use by a computer program.

Code adapted to provide the systems and methods described above may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

The invention claimed is:

1. A communication device, comprising:
   a touchscreen interface configured to detect contact applied at a touchscreen surface;
   one or more force sensors configured to detect force applied at the touchscreen surface;
   at least one processor in communication with the touchscreen interface and the one or more force sensors, the at least one processor being configured to:
      detect contact indicative of input of a password at the touchscreen interface;
      detect, by the one or more force sensors, a force of said contact above a predetermined threshold and set a duress flag upon detection that the force of said contact is above the predetermined threshold;
      identify a duress condition at the communication device upon determining that the input password corresponds to a previously stored password when the duress flag is set.

2. The communication device of claim 1, wherein the password comprises a symbol password.

3. The communication device of claim 2, wherein the symbol password comprises at least one of: multitouch gestures; a plurality of segments; and at least one disconnected touch.

4. The communication device of claim 1, wherein the at least one processor is further configured to initiate a duress handling procedure upon identifying the duress condition.

5. The communication device of claim 1, wherein the at least one processor is further configured to set said duress flag when said force above the predetermined threshold is detected during a portion of the duration of the contact indicative of said input of the password.

6. The communication device of claim 1, wherein the at least one processor is configured to determine that the input password corresponds to the previously stored password when the input password matches the previously stored password within a predefined tolerance.

7. The communication device of claim 1, wherein said force of said contact is above the predetermined threshold when an average applied force during said contact is above the predetermined threshold.

8. The communication device of claim 7, wherein the one or more force sensors comprises one or more piezoelectric sensors.

9. The communication device of claim 1, wherein the communication device comprises a mobile communication device.

10. A method of detecting a duress condition at a communication device comprising a touchscreen interface, the method comprising:
    detecting contact indicative of input of a password at the touchscreen interface;
    detecting a force of said contact above a predetermined threshold and setting a duress flag upon detecting said force of said contact; and
    identifying a duress condition at the communication device upon determining that the input password corresponds to a previously stored password when said duress flag is set.

11. The method of claim 10, wherein the password comprises a symbol password.

12. The method of claim 10, further comprising initiating a duress handling procedure upon identifying the duress condition.

13. The method of claim 10, wherein the duress flag is set upon detection of said force during a portion of a duration of said contact.

14. The method of claim 10, wherein the duress flag is set upon detection of said force during an entirety of a duration of said contact.

15. The method of claim 10, wherein detecting said force comprises detecting an average applied force during said contact above the predetermined threshold.

16. The method of claim 10, wherein the one or more force sensors comprises one or more piezoelectric sensors.

17. The method of claim 10, wherein said determining that the input password corresponds to the previously stored password comprises determining that the input password matches the previously stored password within a predefined tolerance.

18. A computer program product comprising a non-transitory computer-readable medium storing program code which, when executed at a communication device comprising a touchscreen configured to detect contact at the touchscreen and one or more force sensors configured to detect an applied force at the touchscreen, causes the communication device to carry out the method of:
   detecting contact indicative of input of a password at the touchscreen interface;
   detecting a force of said contact above a predetermined threshold during said contact and setting a duress flag upon detecting said force of said contact; and
   identifying a duress condition at the communication device upon determining that the input password corresponds to a previously stored password when said duress flag is set.

* * * * *